(12) United States Patent
Liukku et al.

(10) Patent No.: US 11,067,793 B2
(45) Date of Patent: Jul. 20, 2021

(54) MEMS REFLECTOR SYSTEM WITH TRAJECTORY CONTROL

(71) Applicant: MURATA MANUFACTURING CO., LTD., Nagaokakyo (JP)

(72) Inventors: Matti Liukku, Helsinki (FI); Anssi Blomqvist, Helsinki (FI); Ville-Pekka Rytkönen, Klaukkala (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 186 days.

(21) Appl. No.: 16/268,903

(22) Filed: Feb. 6, 2019

(65) Prior Publication Data
US 2019/0243126 A1 Aug. 8, 2019

(30) Foreign Application Priority Data
Feb. 6, 2018 (FI) ...................................... 20185103

(51) Int. Cl.
| G02B 26/08 | (2006.01) |
| G02B 26/10 | (2006.01) |
| G02B 26/12 | (2006.01) |
| G01S 7/481 | (2006.01) |

(52) U.S. Cl.
CPC ....... *G02B 26/101* (2013.01); *G02B 26/0858* (2013.01); *G01S 7/4817* (2013.01)

(58) Field of Classification Search
CPC .............. G02B 26/0841; G02B 26/085; G02B 26/0858; G02B 26/033; G02B 26/101; G02B 26/105; G02B 26/0833; B81B 3/0083; B81B 3/0086; B81B 2203/04
See application file for complete search history.

(56) References Cited

U.S. PATENT DOCUMENTS

| 9,678,333 B2 | 6/2017 | Goren |
| 2004/0105139 A1 | 6/2004 | Hirose et al. |

(Continued)

FOREIGN PATENT DOCUMENTS

| EP | 2 945 000 A1 | 11/2015 |
| EP | 3 163 353 A1 | 5/2017 |

(Continued)

OTHER PUBLICATIONS

Finnish Search Report corresponding to Appln. No. 20185103, dated Sep. 4, 2018.

(Continued)

*Primary Examiner* — Mustak Choudhury
(74) *Attorney, Agent, or Firm* — Squire Patton Boggs (US) LLP (57) ABSTRACT

A scanning microelectromechanical reflector system comprising a mobile reflector mass and a mobile frame mass which surrounds the mobile reflector mass when the reflector plane coincides with the mobile frame plane. The mobile frame mass is suspended from a fixed frame which at least partly surrounds the mobile frame mass when the mobile frame plane coincides with the fixed frame plane. The reflector system further comprises a pair of first torsion beams aligned on a first axis in the mobile frame plane, and one or more first actuation units which can be configured to rotate the reflector mass and the mobile frame mass about the first axis.

8 Claims, 7 Drawing Sheets

(56) References Cited

U.S. PATENT DOCUMENTS

| | | | |
|---|---|---|---|
| 2007/0008401 A1* | 1/2007 | Cannon | G02B 26/0833 |
| | | | 347/243 |
| 2008/0013140 A1 | 1/2008 | Yasuda et al. | |
| 2009/0051992 A1 | 2/2009 | Fujii et al. | |
| 2009/0161190 A1 | 6/2009 | Obara et al. | |
| 2010/0079572 A1* | 4/2010 | Govorkov | B41J 15/14 |
| | | | 347/260 |
| 2010/0079834 A1 | 4/2010 | Jerman | |
| 2012/0228460 A1 | 9/2012 | Suzuki | |
| 2017/0153443 A1 | 6/2017 | Carminati | |

FOREIGN PATENT DOCUMENTS

| | | |
|---|---|---|
| JP | 2005-148459 A | 6/2005 |
| JP | 2010220344 A | 9/2010 |
| JP | 2011-203575 A | 10/2011 |
| JP | 2012-141462 A | 7/2012 |
| WO | 2009081858 A1 | 7/2009 |
| WO | 2011/114941 A1 | 9/2011 |

OTHER PUBLICATIONS

Sven T. S. Holmström, et al., "MEMS Laser Scanners: A Review", Journal of Microelectromechanical Systems, IEEE, Jan. 16, 2014, vol. 23, No. 2, pp. 259-275.
Oct. 18, 2019 Office Action issued in European Patent Application No. 19152946.
Jun. 13, 2019 Search Report issued in European Patent Application No. 19152946.

* cited by examiner

MEMS REFLECTOR SYSTEM WITH TRAJECTORY CONTROL

FIELD OF THE DISCLOSURE

This disclosure relates to microelectromechanical (MEMS) reflectors configured to scan a laser beam across a one-dimensional line or a two-dimensional surface while oscillating in mechanical resonance. More particularly, this disclosure relates to a device and a method for optimizing the scanning trajectory of such MEMS reflectors.

BACKGROUND OF THE DISCLOSURE

MEMS reflectors can be used in light-detection-and-ranging (LIDAR) systems where a sequence of laser beam pulses is emitted to the environment and retrieved after reflection from a nearby object. The same MEMS reflector may be used to reflect outbound laser pulses from the laser source to the surrounding environment, and to reflect inbound laser pulses towards a photodetector when they return from the surrounding environment. The pulse frequency may be 50 kHz-200 kHz. Since LIDAR systems are typically used at short distances, the preceding pulse usually returns to the photodetector before a new one is emitted. By driving a scanning tilt oscillation in the MEMS reflector, the LIDAR system can obtain information about the surrounding environment within its field-of-view. The momentary position of the MEMS reflector has to be continuously measured, so that the reflection angle of every inbound and outbound laser pulse can be determined.

The MEMS reflector may scan a one-dimensional field-of-view with a simple sine wave scanning pattern, where the momentary reflection angle A equals $A_0 \sin(wt)$, where $A_0$ is the angular amplitude of the scanning motion, $\omega$ is the scanning frequency, and t is time. The rate of change of a sine function is always at a maximum when it crosses the zero-point, and at a minimum when value of the sine function is −1 or +1. Since laser pulses are emitted with a uniform pulse frequency, a simple sine scanning pattern will therefore produce more measurement data from reflection angles which correspond to the maximal tilt amplitude than from reflection angles which are closer to middle section of the field-of-view.

Figure 1:
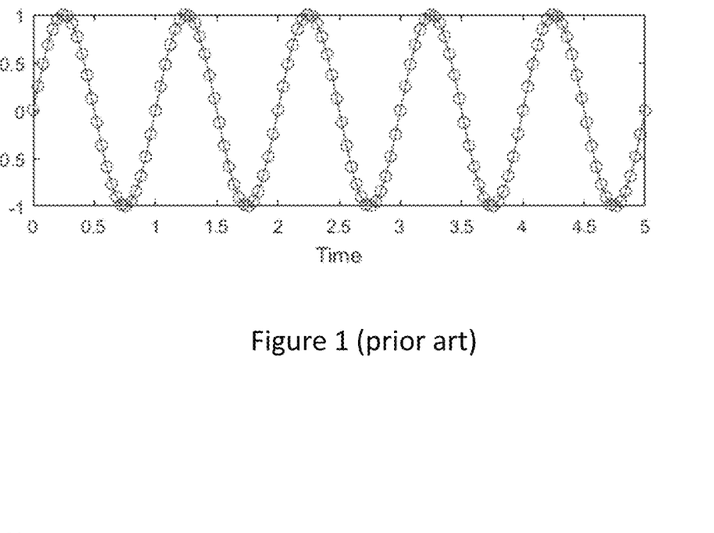
FIG. 1 illustrates a one-dimensional scanning curve based on a sine function

FIG. 1, which depicts a one-dimensional scanning curve based on a sine function $x(t)=\sin(\omega t)$ and a scanning frequency of 1 Hz, illustrates this phenomenon. Purely for illustrative purposes, spots on the curve (which can be imagined as emitted laser pulses) have been drawn with a constant frequency of 25 Hz. Spot clustering is denser close to the maxima and minima on the sine curve than around the middle portions of the curve.

Figure 2:
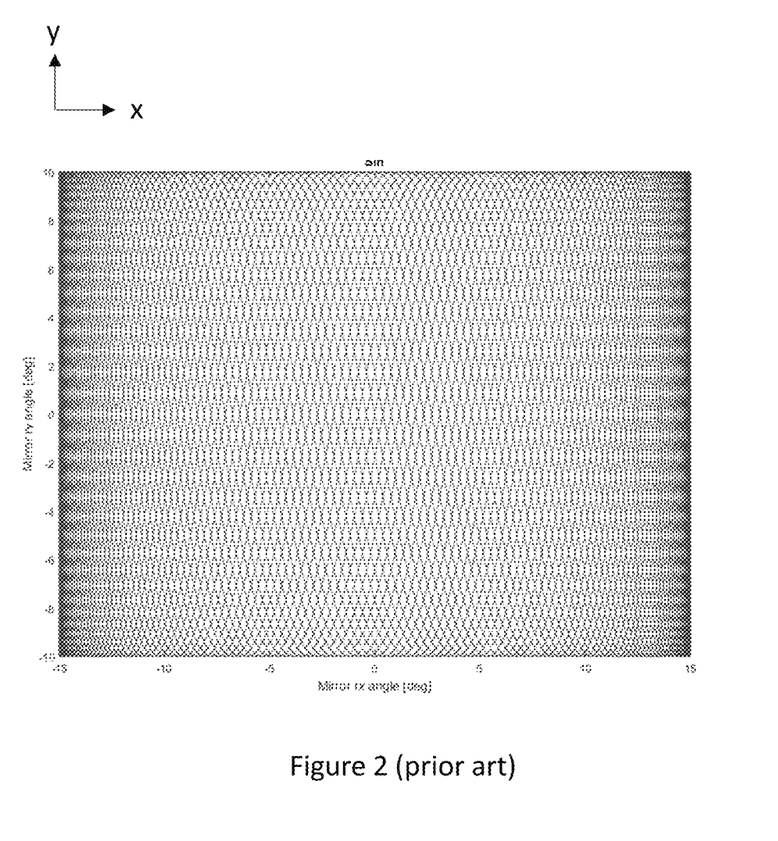
FIG. 2 illustrates two-dimensional lissajous scanning trajectories.

A two-dimensional xy-surface may be scanned with a curve where both the x-coordinate and the y-coordinate are implemented as sine functions. The resulting scanning trajectories may be called lissajous curves. FIG. 2 illustrates lissajous scanning trajectories where the x-axis is scanned with a function $x(t)=\sin(\omega_x t)$ and the y-axis is scanned with the function $y(t)=\sin(\omega_y t)$. The trajectories in FIG. 2 have been drawn with a frequency relationship $\omega_y \approx 6.7\, \omega_x$, and in this case the curves cluster more on the horizontal edges (left and right) of the scan area than on the vertical edges (up and down). If $\omega_y \approx \omega_x$, curve clustering will occur at both the horizontal edges of the scan area (left and right) and on the vertical edges of the scan area (up and down).

The preferred LIDAR measurement resolution and field-of-view depend on the application. Devices designed for use over long distances (longer than 100 m) usually need high resolution across the entire field-of-view, but the field-of-view is quite narrow. In devices which scan the nearby environment a large field-of-view is often required, and a lower resolution must then be accepted. It would be beneficial to have a LIDAR device where this trade-off between the width of the field-of-view and the measurement resolution in the center of the field of view would be avoided. Controlling the measurement resolution within a given sector of the field-of-view requires controlling the angular velocity at which the reflector turns through that sector.

Document US20120228460 discloses a MEMS scanner with a two-dimensional field-of-view. Document U.S. Pat. No. 9,678,333 discloses a driving structure configured to generate a combination of two or more sinusoidal resonant modes in a MEMS scanner with a one-dimensional field-of-view. The apparatus disclosed in U.S. Pat. No. 9,678,333 needs a complicated set of driving structures to generate oscillation in two different resonance modes.

BRIEF DESCRIPTION OF THE DISCLOSURE

An object of the present disclosure is to provide and apparatus and a method to overcome the above problems The objects of the disclosure are achieved by an apparatus and a method which are characterized by what is stated in the independent claims. The preferred embodiments of the disclosure are disclosed in the dependent claims.

The disclosure is based on the idea of utilizing a MEMS reflector system where a central reflector is attached to a mobile frame, and both the reflector and the mobile frame oscillate about the same axis. In this geometry, the reflector and the frame can be driven to oscillate in a common mode at a first resonance frequency, and in a differential mode at a second resonance frequency. When these two resonance modes are driven with sinusoidal voltages where the differential mode frequency is a second or third harmonic of the common mode frequency, the angular velocity of the reflector can be altered in selected sectors of the field-of-view.

An advantage of the apparatus and method of the disclosure is that increased measurement resolution can be obtained in selected parts of the field-of-view in both one-dimensional and two-dimensional scanning.

BRIEF DESCRIPTION OF THE DRAWINGS

In the following the disclosure will be described in greater detail by means of preferred embodiments with reference to the accompanying drawings, in which

FIG. 11a illustrates a method for adjusting common-mode amplitude in the reflector system of FIG. 3a.

FIG. 11b illustrates a method for adjusting differential-mode amplitude in the reflector system of FIG. 3a.

DETAILED DESCRIPTION OF THE DISCLOSURE

This disclosure relates to a scanning microelectromechanical reflector system comprising a mobile reflector mass which defines a reflector plane, and a mobile frame mass which defines a mobile frame plane. The mobile frame mass surrounds the mobile reflector mass when the reflector plane coincides with the mobile frame plane. The mobile frame mass is suspended from a fixed frame which defines a fixed frame plane and at least partly surrounds the mobile frame mass in the fixed frame plane when the mobile frame plane coincides with the fixed frame plane.

The reflector system further comprises a pair of first torsion beams aligned on a first axis in the mobile frame plane, whereby the pair of first torsion beams suspends the mobile reflector mass from the mobile frame mass so that the mobile reflector mass and the mobile frame mass form a mobile mass system. The reflector system also comprises one or more first actuation units connected to the mobile mass system and to the fixed frame, configured to convert one or more first drive voltage signals into forces which drive the mobile mass system into oscillating resonance tilt motion about the first axis.

The reflector system also comprises a control unit configured to apply to the one or more first actuation units one or more first drive voltage signals which comprise a first drive signal component with a first drive signal frequency and a first drive signal phase which correspond to common mode resonance oscillation in the mobile mass system, and the first drive voltage signal also comprises a second drive signal component with a second drive signal frequency and a second drive signal phase which correspond to differential mode resonance oscillation in the mobile mass system. The second drive signal frequency is a second or third harmonic of the first drive signal frequency.

In this disclosure, a "fixed" object means an object which is securely attached to a surrounding structure with a large mass. A fixed object is incapable, or at least nearly incapable, of moving in any direction in relation to this structure by forces presented to it by the MEMS reflector system. The term "anchor point" may be used to refer to a region of a fixed object where partly mobile objects, such as suspension beams, are attached to a fixed object. One end of a suspension beam may be attached to an anchor point, and the other end may be attached to a mobile mass.

In this disclosure, a "mobile" object means an object which can move in relation to fixed structures when the MEMS reflector system is in operation. A partly mobile object may be fixed at one end, but free to move at the other end. A mobile object is typically attached to a fixed object via partly mobile suspension beams. In the silicon-based MEMS applications described in this disclosure, a "suspended" object means an object which is attached to a fixed object only with partly mobile suspension beams. Suspension beams may be silicon beams which are dimensioned so that they can bend or twist when an actuator imparts a force on the suspension beam. Such flexible beams may also be called springs.

In this disclosure, an "actuation unit" may comprise a piezoelectric or capacitive transducer connected to a suspension beam or to a mobile object. An actuation unit may, for example, comprise a piezoelectric transducer and associated connection electrodes prepared on the surface of a suspension beam. Alternatively, an actuation unit may comprise electrodes which form a capacitive transducer between a suspension beam and an adjacent fixed object. Electric circuitry required for bringing an electrical signal to the actuation unit, or for reading an electrical signal from the actuation unit, may be prepared on mobile objects, suspension beams or fixed objects. A capacitive transducer may comprise rotor electrodes on a mobile object, and stator electrodes on a fixed object.

Figure 3A:
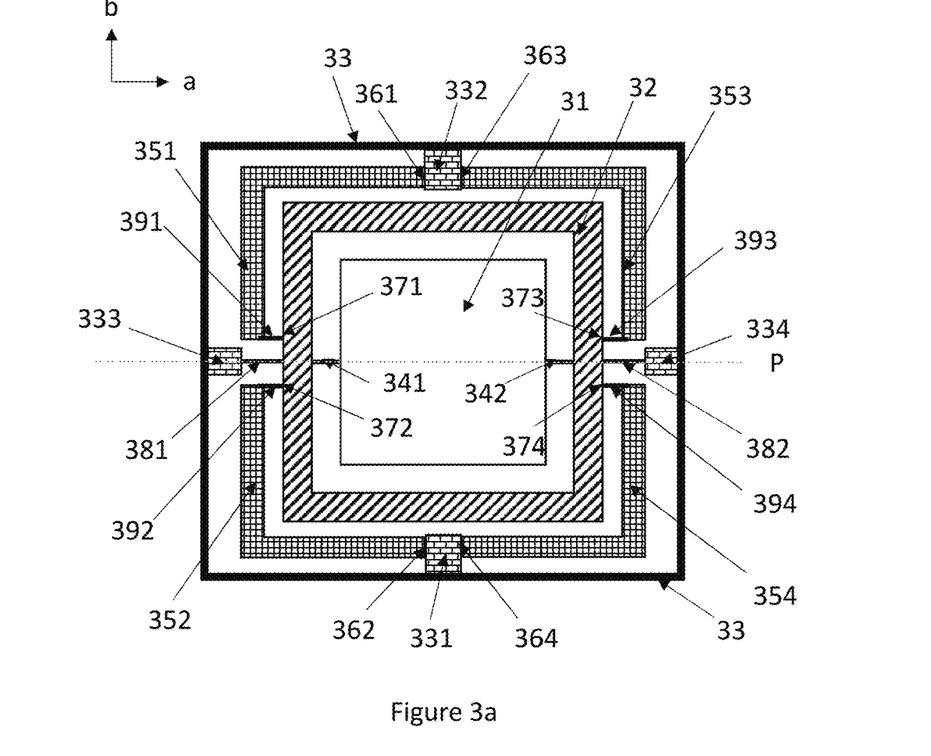
FIG. 3a illustrates a scanning micromechanical reflector system according to a one-dimensional scanning embodiment.
Figure 6:
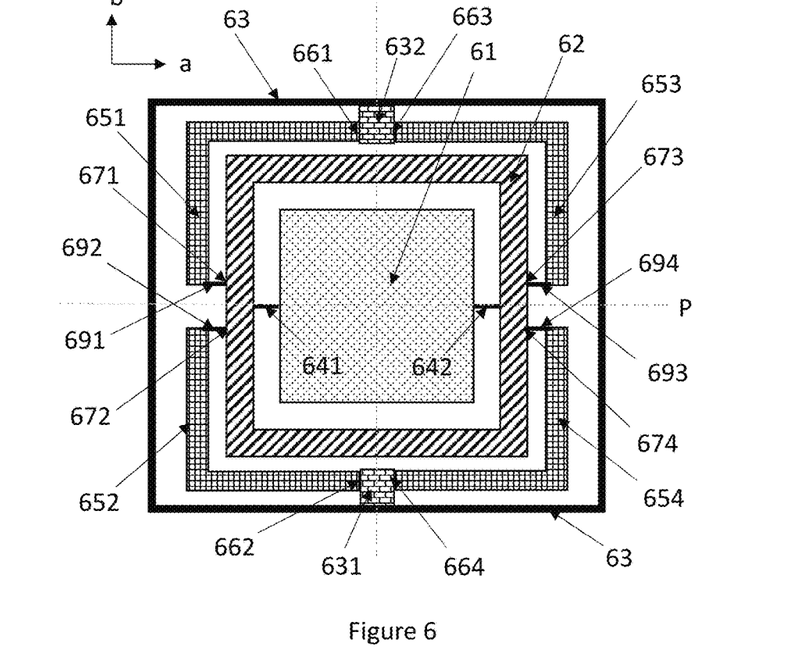
FIG. 6 illustrates a scanning micromechanical reflector system according to a two-dimensional scanning embodiment.

In this disclosure, a direction parallel to the a-axis, for example in FIGS. 3a and 6, will be referred to as a lateral direction. A direction parallel to the b-axis, on the other hand, will be referred to as a transversal direction.

In this disclosure, frequency A is called a "second harmonic" of frequency B when both frequencies A and B are resonance frequencies, and when frequency A is twice as large as frequency B. Similarly, in this disclosure frequency A is called a "third harmonic" of frequency B when both frequencies A and B are resonance frequencies, and when frequency A is three times as large as frequency B. This usage differs somewhat from conventional usage in that A and B are in this case not frequencies which belong to the same resonance mode. Instead, these resonances arise in two separate oscillation modes (common and differential) in the mobile mass system.

Furthermore, in this disclosure the expressions "second harmonic" means that frequency A is at least approximately, but not necessarily exactly, twice as large as frequency B. In other words, frequency A may for example be equal to 1.9B or 2.1B, and still be considered a second harmonic of frequency B in the meaning used in this disclosure. This is due to the fact that resonance frequencies A and B may sometimes differ slightly from their ideal values to due manufacturing limitations, and they may also change over time, for example due to temperature stress. In other words, the expression "second harmonic" should be understood as "approximately twice as large", and the expression "third harmonic" should be understood as "approximately three times as large".

The control unit may, for example, comprise an integrated circuit which is configured to lock with a closed loop drive either to the common mode resonance frequency or to the differential mode resonance frequency. In other words, the reflector system may comprise one or more sensing units connected to the mobile mass system and to the fixed frame, which convert the oscillating resonance tilt motion of the mobile mass system in relation to the first axis into one or more sense voltage signals. The control unit may continuously monitor the frequency response of these sense voltage signals and measure a first frequency which corresponds to one of the two resonance modes. The control unit may be configured to continuously calculate a second frequency, which corresponds to the other of the two resonance modes, from the measured first frequency.

If the measured frequency corresponds to common mode oscillation, the control unit may calculate the second frequency by multiplying the measured first frequency either by two or by three. If the multiplication is by three, the control unit may also add a phase shift of 180 degrees to the calculated second frequency (compared to the phase of the measured frequency). If the multiplication is by two, the control unit may add a phase shift of 90 degrees to the calculated second frequency.

If the measured first frequency corresponds to differential mode oscillation, the control unit may calculate the second frequency by dividing the first frequency either by two or by three. If the division is by three, the control unit may also add a phase shift of 180 degrees to the second frequency (compared to the phase of the measured frequency). If the division is by two, the control unit may subtract a phase shift of 90 degrees from the second frequency (compared to the phase of the first frequency).

If the calculated second frequency corresponds to common mode oscillation, then the control unit may be configured to set the first drive signal component equal to the calculated second frequency. If the calculated second frequency corresponds to differential mode oscillation, then the control unit may be configured to set the second drive signal component equal to the calculated frequency. The control unit may thereby ensure that the mobile mass system is continuously driven into resonance motion where the second drive signal frequency is a second or third harmonic of the first drive signal frequency.

This disclosure also describes a scanning method for a microelectromechanical reflector system comprising a mobile reflector mass which defines a reflector plane, and a mobile frame mass which defines a mobile frame plane, so that the mobile frame mass at least partly surrounds the mobile reflector mass when the reflector plane coincides with the mobile frame plane. The mobile frame mass is suspended from a fixed frame which defines a fixed frame plane and surrounds the mobile frame mass in the fixed frame plane when the mobile frame plane coincides with the fixed frame plane. As stated above, the microelectromechanical reflector system also comprises a pair of first torsion beams aligned on a first axis in the mobile frame plane, whereby the pair of first torsion beams suspends the mobile reflector mass from the mobile frame mass so that the mobile reflector mass and the mobile frame mass form a mobile mass system. And the microelectromechanical reflector system also comprises one or more first actuation units connected to the mobile mass system and to the fixed frame, configured to convert one or more first drive voltage signals into forces which drive the mobile mass system into oscillating resonance tilt motion about the first axis, The method comprises the steps of applying to the one or more first actuation units a first drive voltage signal which comprises a first drive signal component with a first drive signal frequency and a first drive signal phase which correspond to common mode resonance oscillation in the mobile mass system. The first drive voltage signal also comprises a second drive signal component with a second drive signal frequency and a second drive signal phase which correspond to differential mode resonance oscillation in the mobile mass system, wherein the second drive signal frequency is a second or third harmonic of the first drive signal frequency.

One-Dimensional Scanning Embodiment

FIG. 3a illustrates a scanning microelectromechanical reflector system with a mobile reflector mass 31 in the middle. This mass has been coated with a reflective coating and it constitutes the surface from which laser light pulses are reflected outward and inward in the scanning MEMS reflector system. This reflector is referred to as a "reflector mass" to emphasize its contribution to the resonance properties of the mobile mass system. The second component of the mobile mass system is the mobile frame mass 32. The plane defined by this frame is referred to as the mobile frame plane.

The MEMS reflector system also comprises a fixed frame 33, which in this case includes four anchor points 331-334. The fixed frame 33 defines a fixed frame plane which corresponds to the ab-plane in FIG. 3a. The fixed frame 33 does not necessarily have to surround the mobile frame mass on all sides when the mobile frame plane coincides with the fixed frame plane. Smaller fixed structures may sometimes be sufficient for fixing the mobile mass system in place. However, even a partly surrounding fixed frame defines a fixed frame plane parallel to the substrate surface. Even just the anchor points 331-334 may be interpreted as a fixed frame which surrounds the mobile frame mass. Three anchor points are sufficient for defining the fixed frame plane.

The MEMS reflector system illustrated in FIG. 3a also comprises first torsion beams 341 and 342 which suspend the reflector mass 31 from the mobile frame mass 32. The first torsion beams 341 and 342 are aligned on a first axis P, so that one torsion beam 341 is on a first side of the reflector mass 31, and the other torsion beam is on the opposite side of the reflector mass 31.

In FIG. 3a, the mobile frame mass 32 is suspended from the fixed frame 33 by a pair of second torsion beams 381 and 382 aligned on the first axis P, so that the first axis P forms the only tilt axis of the mobile mass system. In other words, the second torsion beams 381 and 382 keep the midpoint of the mobile frame mass 32 fixed to the fixed frame plane. The P-axis is a lateral axis in FIG. 3a. The second torsion beams 381 and 382 are from one end attached to anchor points 333 and 334, respectively. The opposite end of each second torsion beam 381 and 382 is attached to the mobile frame mass 32. The reflector mass 31, mobile frame mass 32, and suspenders 351-354 may all be placed symmetrically in relation to the first axis P, so that the mobile mass system is balanced in relation to the first axis.

The MEMS reflector system illustrated in FIG. 3a can perform one-dimensional scanning. The first axis P is always stationary in the fixed frame plane. The mobile frame mass 32, and thereby the mobile frame plane, rotates in and out of the fixed frame plane when the mobile mass system oscillates. In other words, in one-dimensional scanning the mobile frame mass 32 and the reflector mass 31 may both perform out-of-plane rotation about the first axis P in FIG. 3a, but the axis P itself remains stationary in the illustrated ab-plane. Nevertheless, since first axis P is the rotation axis of the mobile frame mass, this axis still lies within the mobile frame plane even when the mobile frame plane turns.

The mobile frame mass 32 is in FIG. 3a suspended from the anchor points 331 and 332 on the fixed frame 33 by a set of four suspension beams 351-354. The illustrated suspension beams are merely exemplary, and a number of different suspension beam configurations and geometries could be utilized for this purpose. The reflector system may in this case comprises one or more actuation units which comprise piezoelectric transducers on the suspension beams 351-354. The suspension beams should then be dimensioned so that they bend when a drive voltage is applied to the corresponding piezoelectric transducers.

Each suspension beam 351-354 is attached from a first fixing point 361-364 to an anchor point and from a second fixing point 371-374 to the mobile frame mass 32. The attachment can be made with torsionally pliable attachment bars 391-394, as illustrated in the Figure.

By placing the second fixing points 371-374 suitably in relation to the first axis P, and by configuring the control unit to apply a suitable drive voltage signal to the actuation units, the mobile mass system can be driven into oscillating motion by the one or more actuation units. The number of suspension beams may alternatively be more or less than four. The optimal placement of the suspension beams around the mobile frame plane may depend on the geometry of the mobile frame plane.

In other words, each first actuation unit may comprise at least one suspension beam 351-354 which comprises a piezoelectric transducer configured to bend the suspension beam out of the fixed frame plane, and each suspension beam 351-354 may be attached from a first fixing point 361-364 to the fixed frame 33 and from a second fixing point 371-374 to the mobile frame mass 32.

The anchor points where first fixing points 361-364 are located may comprise two anchor points 331-332 aligned on opposite sides of the first axis P. The two anchor points 331-332 may be placed on equal distances from the first axis P. Each suspender 351-354 may be shaped like the letter L, with a first lateral part and a second transversal part. This shape enables the suspender 351-354 to reach around the corresponding corner of the mobile frame mass 32, so that the second fixing points 371-374 can be placed on the lateral ends of the mobile frame mass. The second fixing points 371-374 are in this case closer to the first axis P than the corresponding first fixing point 361-364. The distance from the first axis P to each second fixing point may be optimized so that the torque in relation to both the first axis and the second axis is sufficiently large.

The number of actuation units may be four, and the four second fixing points on the mobile frame mass may define a rectangle in the mobile frame plane. The rectangle may be mirror-symmetric in relation to the first axis.

The considerations given above on suspension beams 351-354 apply also to the two-dimensional scanning embodiment presented below. However, in both the one-dimensional and two-dimensional case, the resonance oscillation of the mobile mass system can be driven with many other suspension and actuation arrangements also.

The at least one actuation unit can alternatively comprise capacitive transducers (not illustrated in FIG. 3a). A capacitive transducer may comprise a first set of electrodes on the fixed frame and a second set of electrodes, interdigitated with the first, on either the mobile frame mass or on the suspenders. In other words, even when capacitive actuation is used, the mobile frame mass may still be suspended from the fixed frame by suspension beams, such as the beams 351-354 in FIG. 3a. The suspension beams should be sufficiently flexible to allow the mobile frame mass to be rotated out of the ab-plane by the capacitive transducer(s).

When the control unit sets the mobile frame mass 32 in rotational oscillation about the first axis P, the torsion beams 341 and 342 undergo a twisting motion. The torsion beams transmit a torque to the reflector mass 31 and set it in oscillating rotation about the first axis P. The torsional spring constants of the first torsion beams 341-342 determines how the motion of the mobile frame mass 32 is coupled to the reflector mass 31. The resonance properties of the mobile mass system (which includes the mobile frame mass and the reflector mass) are also determined by the moments of inertia of the mobile frame mass and the reflector mass with respect to the first axis, and also by the combined spring constants of the second torsion beams 381-382 and the attachment bars 391-394.

Figure 3B:
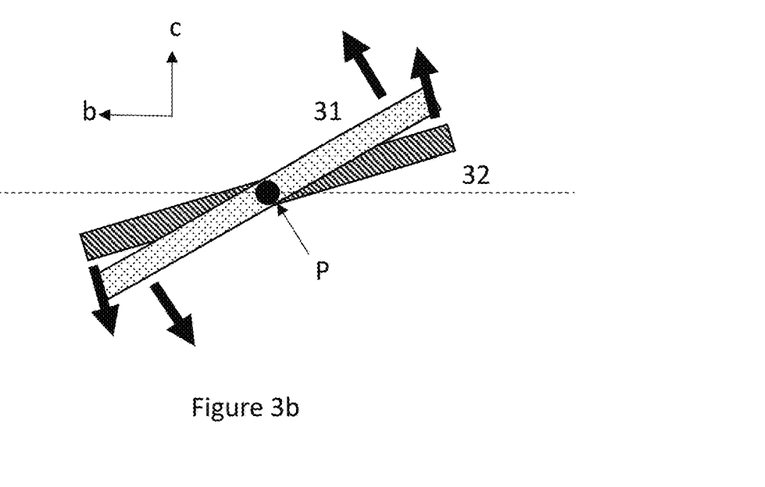
FIG. 3b illustrates common-mode oscillation.
Figure 3C:
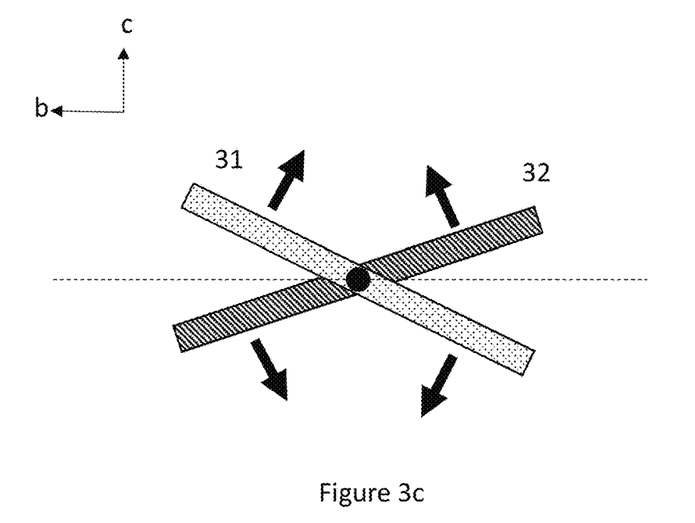
FIG. 3c illustrates differential-mode oscillation.

The mobile mass system will have two resonance modes. In common mode resonance, the mobile frame mass 32 and the reflector mass 31 rotate in the same direction about the first axis P. FIG. 3b, where the dotted line corresponds to the ab-plane and the c-axis is perpendicular to the ab-plane, illustrates this oscillation mode. In differential mode resonance, the mobile frame 32 and the reflector mass 31 rotate in opposite directions about the first axis P. FIG. 3c illustrates this oscillation mode.

In practice these two resonance modes occur simultaneously, so that the resonance motion of the mobile mass system becomes a combination of common mode and differential mode oscillation. The resonance frequency of common mode oscillation is typically lower than the resonance frequency of differential mode oscillation. There is also a phase difference between the common and differential resonance modes.

The frequency of any torsional oscillation is proportional to the square root of the ratio between the torsional spring constant and the moment of inertia. By selecting the torsional spring constants of the first and second torsion beams 341-342 and 381-382 suitably, and by selecting the placement and the torsional spring constants of the attachment bars 391-394 suitably, the common and differential resonance frequencies of the mobile mass system can be adjusted to suitable values. The relative magnitudes of these resonance frequencies may, for example, be adjusted to approximate the relationship 1:2 or 1:3, where the common mode resonance frequency is expressed first.

These considerations on common and differential resonance oscillation about the first axis P also apply in the two-dimensional scanning embodiment presented below.

When the method presented in this disclosure is used to set the reflector system in FIG. 3a in motion, the resonance oscillation of the mobile mass system becomes a combination of common mode and differential mode oscillation. The characteristics of this resonance oscillation are determined by the first drive signal frequency, the second drive signal frequency, and by the corresponding first drive signal amplitude and second drive signal amplitude. By selecting these variables suitably, the scanning pattern of the reflector system, and particularly the spatial distribution of regularly timed laser pulses in the pattern, can be changed.

Two combinations of common and differential resonance modes are particularly important. In the first combination, the differential mode frequency is equal to the third harmonic of the common frequency, and the phase difference between the two modes is 180°. In the second combination, the differential mode frequency is equal to the second harmonic of the common frequency, and the phase difference between the two modes is 90°. Resonance motion where the mobile mass system achieves the first combination creates a scanning pattern where spots are more densely packed in the center of the scanning range of the reflector system than at the edges. Resonance motion where the mobile mass system achieves the second combination creates a scanning pattern where spots can be distributed more densely at one end of the scanning range than at the other. These general considerations on the first combination and the second combination also apply in the two-dimensional scanning embodiment presented below.

Figure 4:
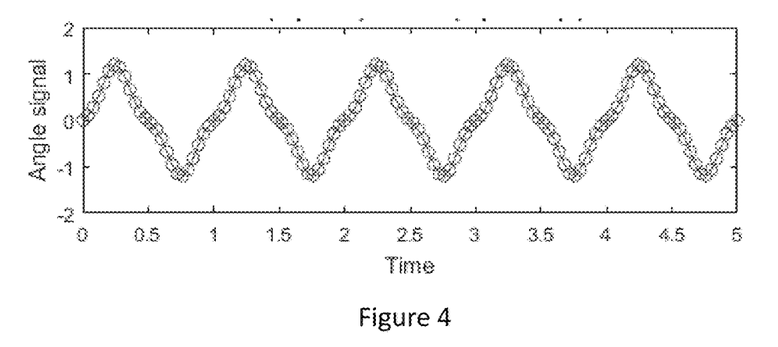
FIG. 4 illustrates a one-dimensional scanning curve based on a sum of sine functions.

FIG. 4 illustrates schematically the distribution of spots when 1-dimensional scanning is performed with a drive voltage signal where the first combination has been implemented. In this case the combination can be written as:

$$x(t)=\sin(\omega t)+0.2\cdot\sin(3\omega t+180°)$$

where x represents the scanned coordinate, w is the first drive signal frequency and 3ω is the second drive signal frequency. The pattern is merely illustrative, because the indicated scanning frequency is not a realistic MEMS reflector frequency. However, it can be clearly seen that the spots, which have been pulsed at regular time intervals, are much more evenly distributed across all values of the scanning coordinate y than in the simple sine scanning pattern shown in FIG. 1. In other words, compared to the scanning trajectory shown in FIG. 1, the trajectory in FIG. 4 indicates a slower angular velocity in the reflector in the middle of the field-of-view. More measurement data can therefore be gathered near the midpoint of the field-of-view, which improves the measurement resolution.

Figure 5:
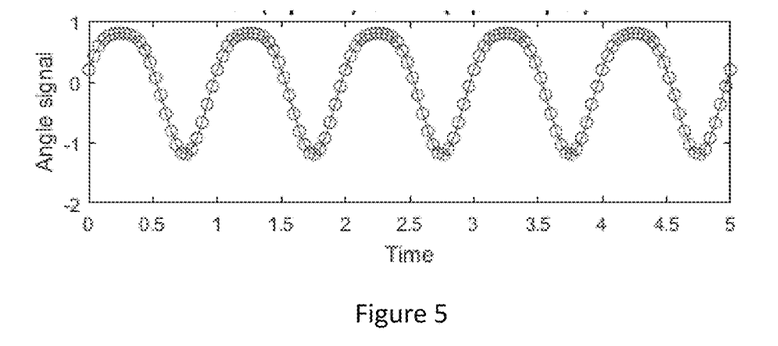
FIG. 5 also illustrates a one-dimensional scanning curve based on a sum of sine functions.

FIG. 5 illustrates schematically the distribution of spots when 1-dimensional scanning is performed with a drive voltage signal where the second combination has been implemented. In this case the combination can be written as:

$$x(t)=\sin(\omega t)+0.2\cdot\sin(2\omega t+90°)$$

where ω is the first drive signal frequency and 2ω is the second drive signal frequency. The pattern is again merely schematic and the scanning frequency is not realistic. In this case the spots are distributed more densely in the upper part of the scanning range than in the lower part. In other words, the second combination decreases the angular velocity of the reflector (and thereby increases point density and improves measurement resolution) on one edge of the field-of-view. These observations will be extended to the two-dimensional case below.

Two-Dimensional Scanning Embodiment

FIG. 6 illustrates a scanning microelectromechanical reflector system with a mobile reflector mass 61 in the middle. This reflector system can be used in two-dimensional scanning Reference numbers 61, 62, 63, 631, 632, 641, 642, 651-654, 661-664, 671-674 and 691-694 correspond to reference numbers 31, 32, 33, 331, 332, 341, 342, 351-354, 361-364, 371-374 and 391-394 in FIG. 3a, respectively.

In this case the fixed frame 63 includes two anchor points 631 and 632, but the mobile frame mass 62 is not attached to fixed frame 63 on the first axis P. The first axis P always lies in the mobile frame plane because the torsion beams 641 and 642 always follow the movement of the mobile frame mass. When the MEMS reflector system performs two-dimensional scanning, the mobile frame mass 62 is also driven into to rotate out of the ab-plane about a second axis which is perpendicular to P, for example axis Q in FIG. 6. In this case, first axis P does not remain stationary in the fixed frame plane. It will oscillate about the Q-axis along with the mobile frame mass 62. But the first axis P always lies in the mobile frame plane defined by the mobile frame mass 62. The axis P is lateral in FIG. 6, and the axis Q is transversal.

Oscillation about the first axis P can be generated with the same actuation mechanisms which were described in the one-dimensional scanning embodiment above. Two-dimensional oscillation requires oscillation about the second axis Q also. The mobile frame mass 62 may be suspended from the fixed frame 63 by two or more suspension beams 651-654, and the system may comprise one or more second actuation units connected to the two or more suspension beams. The control unit may be configured to apply to the one or more second actuation units one or more second drive voltage signals which comprise a third drive signal component with a third drive signal frequency, which the one or more second actuation units convert into forces which drive the mobile mass system into oscillating resonance tilt motion about a second axis Q in the fixed frame plane. The second axis Q is perpendicular to the first axis P when the mobile frame plane coincides with the fixed frame plane.

The reflector mass 61, mobile frame mass 62, and suspenders 651-654 may all be placed symmetrically in relation to both the first axis P, and they may also be placed symmetrically in relation to the second axis Q.

The second actuation units may comprise piezoelectric actuation units on any of the suspension beams, or they comprise capacitive transducers with interdigitated electrodes on the mobile frame mass and on the fixed frame.

The at least one second actuation unit may be the same actuation unit(s) as the first actuation unit(s). In other words, the same actuation unit may generate both the oscillation about the first axis P and the oscillation about the second axis Q. Taking the suspension beams 651-654 as an example, and assuming that each of these beams comprises a piezoelectric actuation unit which can bend the suspender in and out of the fixed frame plane, the control unit may be configured to generate the oscillation about the first axis P by simultaneously lifting/lowering the second attachment points 671 and 673 of suspension beams 651 and 653 and lowering/lifting the second attachment points 672 and 674 of the suspension beams 652 and 654. The oscillation about the second axis Q, on the other hand, may be generated by configuring the control unit to simultaneously lift/lower the second attachment points 671 and 672 of suspension beams 651 and 652, while simultaneously lowering/lifting the second attachment points 673 and 674 of the suspension beams 653 and 654. The first and second drive voltage signals may in this case be superposed in one drive voltage signal which is applied to the actuation units, and the movement of the mobile mass system becomes a corresponding combination of the oscillatory movements about the first axis P and the second axis Q.

Alternatively, the second actuation units may not be the same actuation units as the first actuation units. For example, the control unit may be configured to generate the oscillation about the first axis P merely by lifting and lowering the lifting and lowering the second attachment points 671 and 673 of suspension beams 651 and 653. The control unit may be configured to generate the oscillation about the second axis B merely by lifting the second attachment point 672 of suspension beam 652 while lowering the second attachment point 674 of the suspension beam 654, and vice versa. Yet another alternative is that each suspension beam 651-654 comprises one piezoelectric actuator which functions as a first actuation unit and a second piezoelectric actuator which functions as a second actuation unit. In this case, the first and second drive voltage signals may be entirely separate signals which are applied to separate actuation units.

In either case, whether the second actuation units are the same actuation units as the first actuation units or not, each first actuation unit and each second actuation unit may comprise at least one suspension beam 651-654 which comprises a piezoelectric transducer configured to bend the suspension beam out of the fixed frame plane, and each actuation unit 651-654 may be attached from a first fixing point 661-664 to the fixed frame 63 and from a second fixing point 671-674 to the mobile frame mass 62.

These considerations about piezoelectric actuation units placed on different sides of the first axis P and the second axis Q also apply directly to capacitive actuation units in the same locations.

The oscillation frequency about the second axis Q may be lower than the common mode oscillation frequency about the first axis P. The oscillation frequency about the second axis Q may, for example, be a few hundred Hertz, while the common mode oscillation frequency about the first axis P may be a few thousand Hertz. The oscillations about the first axis and second axis can be completely independent, so that one can be adjusted while the other one remains constant.

The anchor points where first fixing points 661-664 are located may comprise two anchor points 631-632 aligned on the second axis Q on opposite sides of the first axis P. The two anchor points 631-632 may be placed on equal distances from the first axis P. As in the one-dimensional example, the second fixing points 671-674 may be closer to the first axis P than the corresponding first fixing points 661-664, as illustrated in FIG. 6. The distance from the first axis P and the second axis Q to each second fixing point 671-674 may be optimized so that the torque in relation both the first axis and the second axis is sufficiently large.

The number of actuation units may be four, and the four second fixing points on the mobile frame mass may define a rectangle in the mobile frame plane. The midpoint of the rectangle may be located at the intersection of first axis P and the second axis Q.

Figure 7:
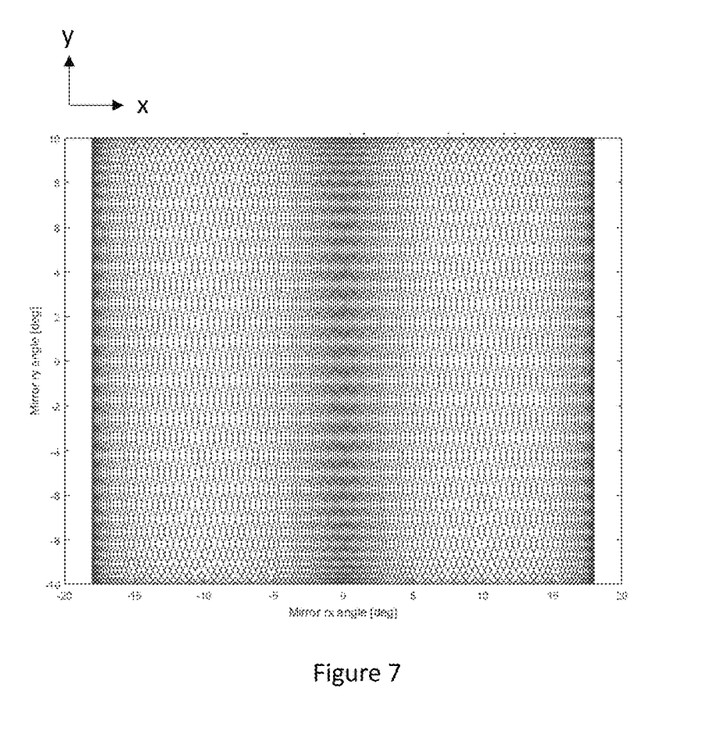
FIG. 7 illustrates two-dimensional scanning curves where the x-axis scan is a sum of since functions and the y-axis scan is a sine function.

FIG. 7 illustrates scanning trajectories when 2-dimensional scanning is performed with a first drive voltage signal where the first combination has been implemented, and with a second drive voltage signal which is a simple sine function. In other words, the scan functions are:

$x(t)=\sin(\omega_x t)+0.2\cdot\sin(3\omega_x t+180°)$ $y(t)=\sin(\omega_y t)$ where x represents the horizontal scanning coordinate and y the vertical scanning coordinate, $\omega_x$ is the first drive signal frequency, $3\omega_x$ is the second drive signal frequency and $\omega_y$ is the third drive signal frequency. The curve trajectories cluster much more closely around the middle of the horizontal axis than in the simple sine scanning trajectories shown in FIG. 2. This means that the angular velocity of the reflector has been lowered in the horizontal mid-section of the field-of view, and the mid-section can therefore in FIG. 7 be scanned with a greater measurement resolution than with the trajectories in FIG. 2.

Figure 8:
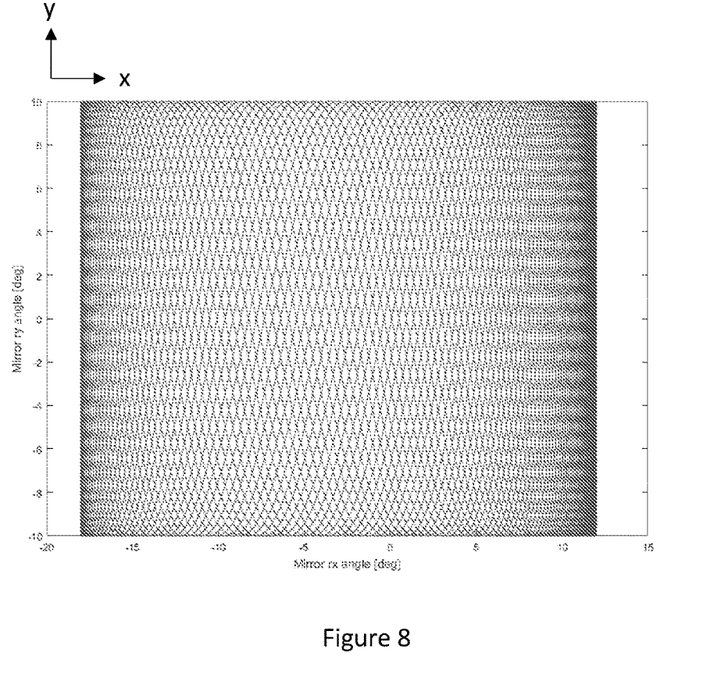
FIG. 8 also illustrates two-dimensional scanning curves where the x-axis scan is a sum of since functions and the y-axis scan is a sine function.

FIG. 8 illustrates scanning trajectories when 2-dimensional scanning is performed with a first drive voltage signal where the second combination has been implemented, and with a second drive voltage signal which is a simple sine function. In other words, the scan functions are:

$x(t)=\sin(\omega_x t)+0.2\cdot\sin(2\omega_x t+90°)$ $y(t)=\sin(\omega_y t)$ where $\omega$ is the first drive signal frequency and $2\omega$ is the second drive signal frequency. In this case, the curve trajectories cluster more on the right side of the horizontal axis than in the middle or the left. In other words, the angular velocity of the reflector has been lower on the right side of the field-of-view, and this sector can therefore be scanned with greater measurement resolution. The sector may also be shifted to the left side of the horizontal axis by changing the phase difference between the first and second drive signal components.

Drive Frequency Tuning

When MEMS reflector systems are implemented with multiple resonance modes, the possibility exists that the resonance properties of the system shift in relation to each other during the lifetime of the component. In other words, the initial 1:2 or 1:3 relationship between the common mode resonance frequency and the differential mode resonance frequency may not remain accurate indefinitely. Frequency shifts may occur due to temperature stress or mechanical stress which affects the reflector system. The spring constants of the suspenders may therefore drift during usage.

Close to the resonance frequency, even a small frequency drift in the first or second drive signal frequency can dramatically change the phase difference which should be present between the first and second drive signal components to sustain the resonance oscillation of the mobile mass system.

Furthermore, limitations in manufacturing tolerances can also make the dimensions of mobile components in the system slightly different from ideal design values. This can make even the initial relationship between the common and differential mode resonance frequencies slightly different than the planned 1:2 or 1:3 proportion. The resonance of the mobile mass system is not driven in an optimal way if the relationship between the first and second drive signal frequencies does not exactly correspond to the resonance properties of the mobile mass system.

In other words, the true differential mode resonance frequency, which is determined by the mechanical properties of the mobile mass system, may not always be exactly equal to the ideal value, which is the second or third harmonic of the common mode resonance frequency. The true differential mode resonance frequency may, for example, drift to a value of 3.1 times the common mode resonance frequency when the reflector system is in use. The driving scheme described above, where the control unit sets the second drive signal frequency to a value which equals exactly 3 times the measured common mode resonance frequency, would in this case no longer be optimal. If the frequency drift is severe, a driving scheme based on a fixed value (such as 3) may entirely fail to generate the desired resonance in the mobile mass system.

To prevent problems that arise with frequency drift, this disclosure describes a scanning microelectromechanical reflector system which comprises one or more sensing units connected to the mobile mass system and to the fixed frame, configured to convert the oscillating resonance tilt motion of the mobile mass system in relation to the first axis into one or more sense voltage signals, and one or more drive tuning units connected to the mobile mass system, configured to convert one or more drive tuning voltages into forces which alter the oscillation of the mobile mass system about the first axis, The control unit may be configured to repeatedly measure from one or more sense voltage signals a first sense signal component which corresponds to common mode resonance oscillation in the mobile mass system and a second sense signal component which corresponds to differential mode resonance oscillation in the mobile mass system, and to determine a measured phase difference between the first sense signal component and the second sense signal component. The control unit may also be configured to continuously apply to the one or more drive tuning units one or more drive tuning voltages to keep the measured phase difference equal to a predetermined phase difference value.

The corresponding method comprises the step of repeatedly measuring from the one or more sense voltage signals a first sense signal component which corresponds to common mode resonance oscillation in the mobile mass system and a second sense signal component which corresponds to differential mode resonance oscillation in the mobile mass system, and determining a measured phase difference between the first sense signal component and the second sense signal component. The method also comprises the step of continuously applying to the one or more drive tuning units one or more drive tuning voltage signals to keep the measured phase difference equal to a predetermined phase difference value.

In other words, the MEMS reflector system may comprise sense transducers for monitoring the oscillation of the mobile mass system. Motion sensing is usually incorporated in MEMS reflector systems because the orientation of the reflector must be measured as a function of time. A laser pulse emitted and retrieved at a given moment in time can then be stored with a time stamp and with a reference to a specific position in the field-of-view. If the MEMS reflector system scans a two-dimensional field-of-view, the system may comprise sense transducers for measuring the oscillation of the mobile mass system about both the first axis P and the second axis Q.

However, in this disclosure, regardless of whether the MEMS reflector system performs one-dimensional or two-dimensional scanning, the term "sensing unit" refers only to sense transducers which measure the resonance oscillation of the mobile mass system about the first axis P, and the term "sense signal" refers only to a signal obtained from these sense transducers.

As explained above, the resonance oscillation of the MEMS reflector system about the first axis P comprises two separate resonance modes, common and differential. The resonance oscillation of the mobile mass system about the second axis Q, on the other hand, comprises only one resonance mode. The oscillation about the second axis Q can be adjusted for frequency drift by measuring the corresponding resonance frequency and adjusting the third drive signal frequency if necessary. The oscillation of the mobile mass system about the first axis P, on the other hand, is more precarious because both the frequencies and phases of the first drive signal component and the second drive signal component must correspond exactly to the true common and differential oscillation modes of the mobile mass system. A small phase error in the applied force, for example, may quickly retard the mobile mass system away from balanced resonance.

The one or more sensing units connected to the mobile mass system and to the fixed frame may, for example, be piezoelectric transducers on suspenders. Alternatively, they may be capacitive transducers with rotor electrodes on the mobile mass frame and stator electrodes on the fixed frame. The rotor electrodes may also be placed on partly mobile suspenders instead of on the mobile mass frame. A sense signal may be read from a piezoelectric sense transducer when the movement of the mobile mass system bends the suspender. Or a sense signal may be read from a capacitive sense transducer when the movement of the mobile mass system induces alternating charge accumulation and dissipation in the rotor and stator electrodes.

Figure 9:
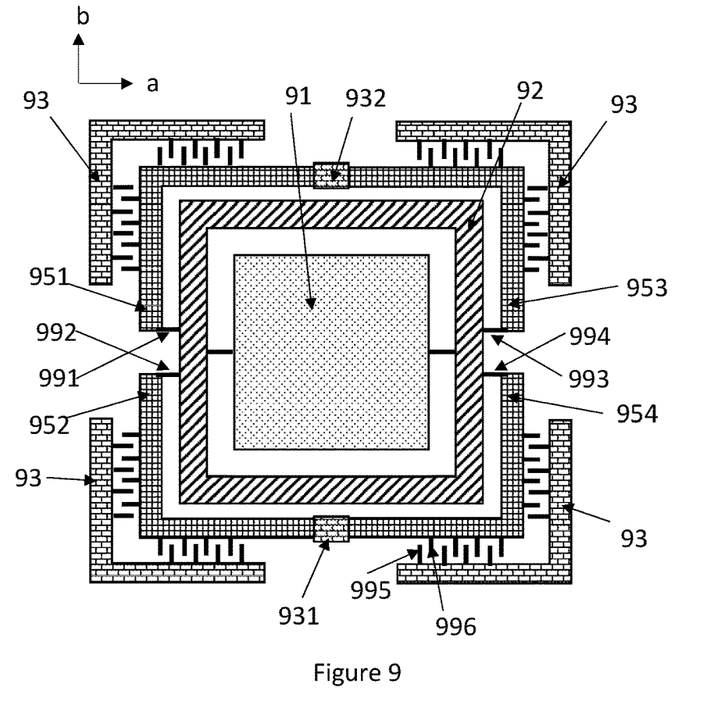
FIG. 9 illustrates a scanning micromechanical reflector system with capacitive drive-tuning units.

In FIGS. 3a, 6 and 9, the reflector system may for example comprise four sensing units. Each sensing unit may be a piezoelectric transducer placed on one of the suspenders 351-354, 651-654 or 951-954, respectively. If several sensing units are used to measure the same variable, the voltages obtained from these transducers may be combined to obtain a stronger sense signal. The movement of the reflector mass does not have to be separately monitored. A sense signal measured from the movement of the mobile frame mass reveals all the necessary information about the oscillation of the mobile mass system.

As stated above, the drive tuning unit converts one or more drive tuning voltages into forces which alter the oscillation of the mobile mass system about the first axis. The drive tuning unit may, in particular, convert the drive tuning voltage into one or more forces (corresponding to one or more drive tuning units) which act as electrostatic spring constants on the mobile mass system. In other words, frequency drift in the resonance oscillation of the mobile mass system may be corrected or compensated by configuring the control unit to respond to frequency drift with a suitable drive tuning voltage. The force from the drive tuning unit then acts on the mobile mass as an electrostatic spring constant. If the drive tuning voltage is applied to the mobile mass system permanently, the electrostatic spring constant also has a permanent influence on the resonance oscillation. The magnitude of a drive tuning voltage signal may gradually be adjusted further if the resonance properties of the mobile mass system drift further away from their original values during usage.

The drive tuning units may, for example, comprise one or more capacitive transducers with rotor electrodes on the mobile mass frame and stator electrodes on the fixed frame. FIG. 9 illustrates a MEMS reflector system where reference numbers 91, 92, 931-932, 951-954 and 991-994 correspond to reference numbers 61, 62, 631-632, 651-654 and 691-694, respectively, in FIG. 6. The fixed frame 93 comprises stator electrodes 995, and corresponding rotor electrodes 996 have been placed on the suspenders 951-954.

Figure 10:
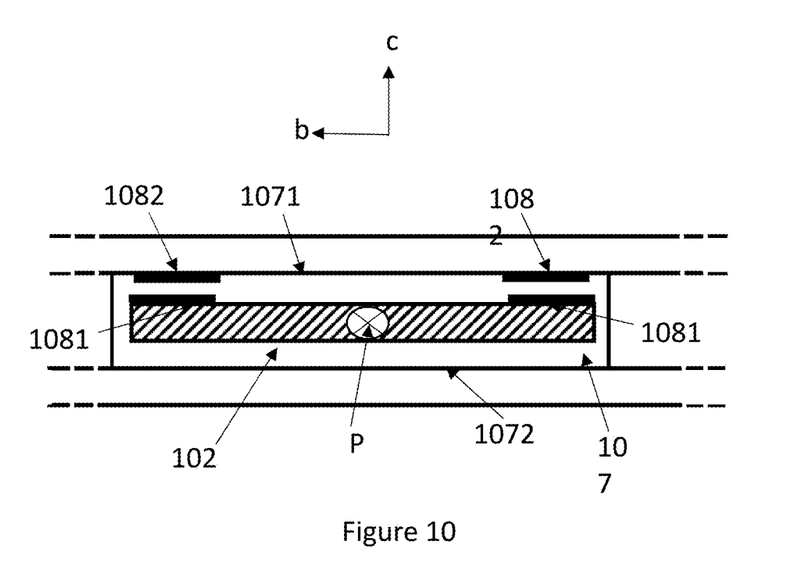
FIG. 10 also illustrates a scanning micromechanical reflector system with capacitive drive-tuning units.

Alternatively, the drive tuning units may comprise one or more capacitive transducers with rotor electrodes on the mobile mass frame and stator electrodes on a cavity wall above or below the mobile frame plane. FIG. 10 illustrated a MEMS reflector system where reference number 102 corresponds to reference number 62 in FIG. 6. The Figure is a vertical cross-section, so that the indicated c-axis is perpendicular to the ab-plane. The mobile frame mass 102, and the whole mobile mass system, oscillates about the first axis P, which is perpendicular to the bc-plane. The mobile mass system oscillates within a cavity 107 which is delimited in the vertical c-direction by cavity walls 1071 and 1072. The cavity wall may, for example, be a part of a packaging wafer placed on top of the device wafer.

The rotor electrodes 1081 of the drive tuning unit may be placed on the mobile frame mass 102, preferably far away from the first axis P, near the edge of the mobile frame mass which comes closest to the cavity wall 1071 when the mobile mass system oscillates. The stator electrodes 1082 of the drive tuning unit may be placed on the cavity wall 1071, and they may be vertically aligned with the rotor electrodes 1081. Stator electrodes could alternatively be placed on the lower cavity wall 1072 illustrated in FIG. 10, with corresponding rotor electrodes on the lower side of the mobile frame mass 102. Rotor and stator electrodes could alternatively be placed on both the upper and lower sides of the mobile frame mass 102.

The control unit of the MEMS reflector system may be configured to continuously monitor the sense voltage signals produced by the one or more sensing units. The control unit may be configured to identify first and second sense signal components which correspond to the common mode and differential mode resonance modes, respectively. The control unit may be configured to measure the phase difference between the signal components which correspond to the two resonance modes. If the differential mode resonance frequency is the second harmonic frequency of the common mode resonance frequency, the predetermined phase difference is 90°. If the differential mode resonance frequency is the third harmonic frequency of the common mode resonance frequency, the predetermined phase is 180°.

If the measured phase difference between the common mode oscillation and the differential mode oscillation is equal to these ideal values, the driving scheme presented above will sustain both resonance modes. However, if the measured phase difference differs from the predetermined phase difference (which is either 90° or 180°), then at least one of the resonance frequencies has drifted, and the MEMS reflector system may at risk of losing the resonance oscillation of the mobile mass system.

The control unit may be configured to apply a drive tuning voltage to the drive tuning unit if the measured phase difference differs from the predetermined phase difference. The electrostatic spring constant produced by this voltage changes the resonance properties of the mobile mass system. It may change the common mode resonance frequency, or the differential mode resonance frequency, or both. The control unit may be configured to target a change in a particular resonance frequency for example by applying to a first drive tuning voltage to the drive tuning units which are located on one side of the first axis P, and applying second drive tuning voltage to the drive tuning units which are located on the other side of the first axis P. If the first and second drive tuning voltages are not equal, one of the two resonance frequencies will typically be more strongly affected by the drive tuning than the other.

The control unit may be configured to vary the drive tuning voltage, for example by raising it, until the measured phase difference again becomes equal to the predetermined phase difference. The control unit may be configured to maintain the drive tuning voltage at the level where the measured phase difference is equal to the predetermined phase difference, until a new phase difference measurement reveals that the phase difference has changed again.

Figure 11A:
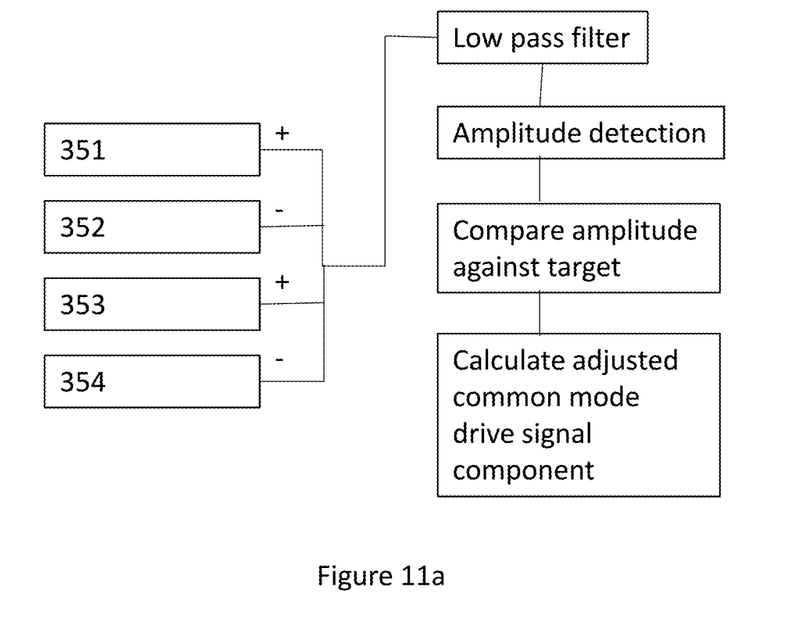

The orientation of the reflector and the oscillation amplitude in both resonance modes can be continuously monitored through the sense voltage signals obtained from the one or more sensing units. FIG. 11a illustrates a method for adjusting the amplitude of the common mode in the reflector system illustrated in FIG. 3a. In this example, sense voltage signals from four sensing units placed on suspenders 351-354 are combined into one signal, as illustrated on the left side of the figure. This signal is passed through a low-pass filter and an amplitude detection unit. The detected amplitude is compared against a target value for the common mode resonance amplitude. If the detected amplitude differs from the target value, the amplitude of the drive signal component which corresponds to the common mode can be adjusted accordingly, so that the common mode amplitude returns closer to its target value.

Figure 11B:
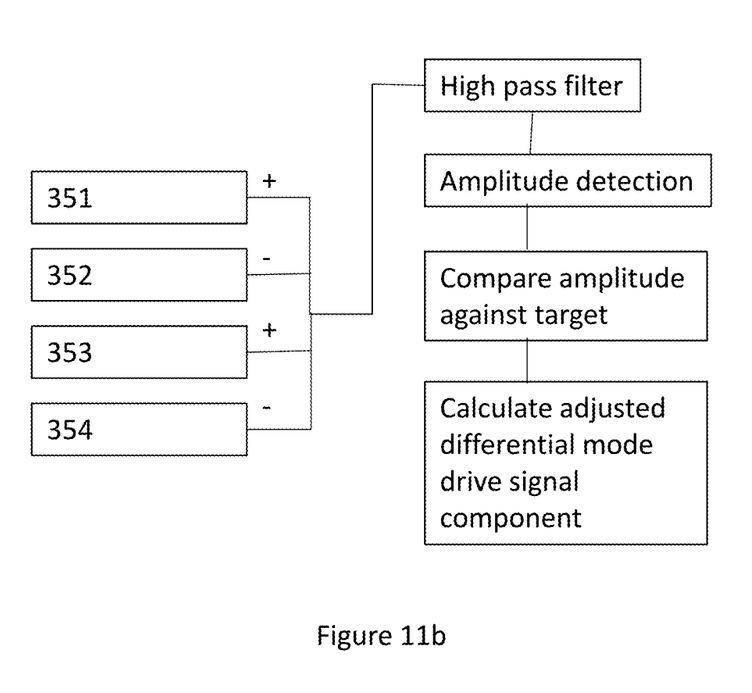

FIG. 11b illustrates the corresponding method for adjusting the amplitude of the differential mode in the reflector system illustrated in FIG. 3a. In this case the combined signal is passed through a high-pass filter, and the amplitude of the drive signal component which corresponds to the differential mode is adjusted after the comparison to the target value.

The invention claimed is:

1. A scanning microelectromechanical reflector system, comprising:
   a mobile reflector mass which defines a reflector plane, and a mobile frame mass which defines a mobile frame plane so that the mobile frame mass surrounds the mobile reflector mass when the reflector plane coincides with the mobile frame plane, wherein the mobile frame mass is suspended from a fixed frame which defines a fixed frame plane and at least partly surrounds the mobile frame mass in the fixed frame plane when the mobile frame plane coincides with the fixed frame plane;
   a pair of first torsion beams aligned on a first axis in the mobile frame plane, whereby the pair of first torsion beams suspends the mobile reflector mass from the mobile frame mass so that the mobile reflector mass and the mobile frame mass form a mobile mass system;
   one or more first actuation units connected to the mobile mass system and to the fixed frame, configured to convert one or more first drive voltage signals into forces which drive the mobile mass system into oscillating resonance tilt motion about the first axis;
   a control unit configured to apply to the one or more first actuation units one or more first drive voltage signals which comprise a first drive signal component with a first drive signal frequency and a first drive signal phase which correspond to common mode resonance oscillation in the mobile mass system, and the first drive voltage signal also comprises a second drive signal component with a second drive signal frequency and a second drive signal phase which correspond to differential mode resonance oscillation in the mobile mass system,
   wherein the second drive signal frequency is a second or third harmonic of the first drive signal frequency,
   and the mobile frame mass is suspended from the fixed frame by four suspension beams, and the system comprises one or more second actuation units connected to the four suspension beams,
   and the control unit is configured to apply to the one or more second actuation units one or more second drive voltage signals which comprise a third drive signal component with a third drive signal frequency, which the one or more second actuation units convert into forces which drive the mobile mass system into oscillating resonance tilt motion about a second axis in the fixed frame plane, and
   wherein the second axis is perpendicular to the first axis when the mobile frame plane coincides with the fixed frame plane,
   and each first actuation unit and each second actuation unit comprises at least one of said four suspension beams which comprises a piezoelectric transducer configured to bend the suspension beam out of the fixed frame plane, and each actuation unit is attached from a first fixing point to the fixed frame and from a second fixing point to the mobile frame mass,
   and the number of actuation units is four, and the four second fixing points on the mobile frame mass define a rectangle in the mobile frame plane, and the rectangle is mirror-symmetric in relation to the first axis.

2. The scanning microelectromechanical reflector system according to claim 1, further comprising:
   one or more sensing units connected to the mobile mass system and to the fixed frame, configured to convert the oscillating resonance tilt motion of the mobile mass system in relation to the first axis into one or more sense voltage signals;
   one or more drive tuning units connected to the mobile mass system, configured to convert one or more drive tuning voltages into forces which alter the oscillation of the mobile mass system about the first axis, wherein the control unit is also configured to
repeatedly measure from one or more sense voltage signals a first sense signal component which corresponds to common mode resonance oscillation in the mobile mass system and a second sense signal component which corresponds to differential mode resonance oscillation in the mobile mass system, and to determine a measured phase difference between the first sense signal component and the second sense signal component, and
continuously apply to the one or more drive tuning units one or more drive tuning voltage signals to keep the measured phase difference equal to a predetermined phase difference value.

3. The scanning microelectromechanical reflector system according to claim 2, wherein the one or more drive tuning units comprise one or more capacitive transducers with rotor electrodes on the mobile mass frame and stator electrodes on the fixed frame.

4. The scanning microelectromechanical reflector system according to claim 2, wherein the one or more drive tuning units comprise one or more capacitive transducers with rotor electrodes on the mobile mass frame and stator electrodes on a cavity wall above or below the mobile frame plane.

5. A scanning method for a microelectromechanical reflector system, comprising:
a mobile reflector mass which defines a reflector plane, and a mobile frame mass which defines a mobile frame plane so that the mobile frame mass surrounds the mobile reflector mass when the reflector plane coincides with the mobile frame plane, wherein the mobile frame mass is suspended from a fixed frame which defines a fixed frame plane and at least partly surrounds the mobile frame mass in the fixed frame plane when the mobile frame plane coincides with the fixed frame plane,
a pair of first torsion beams aligned on a first axis in the mobile frame plane, whereby the pair of first torsion beams suspends the mobile reflector mass from the mobile frame mass so that the mobile reflector mass and the mobile frame mass form a mobile mass system, and
one or more first actuation units connected to the mobile mass system and to the fixed frame, configured to convert one or more first drive voltage signals into forces which drive the mobile mass system into oscillating resonance tilt motion about the first axis,
wherein the method comprises applying to the one or more first actuation units a first drive voltage signal which comprises a first drive signal component with a first drive signal frequency and a first drive signal phase which correspond to common mode resonance oscillation in the mobile mass system, and the first drive voltage signal also comprises a second drive signal component with a second drive signal frequency and a second drive signal phase which correspond to differential mode resonance oscillation in the mobile mass system, wherein the second drive signal frequency is a second or third harmonic of the first drive signal frequency,
and the mobile frame mass is suspended from the fixed frame by four suspension beams, and the system comprises one or more second actuation units connected to the four suspension beams, and the one or more second actuation units are configured to convert one or more second drive voltage signals into forces which drive the mobile mass system into oscillating resonance tilt motion about a second axis in the fixed frame plane, wherein the second axis is perpendicular to the first axis when the mobile frame plane coincides with the fixed frame plane,
wherein each first actuation unit and each second actuation unit comprises at least one of said four suspension beams which comprises a piezoelectric transducer configured to bend the suspension beam out of the fixed frame plane, and each actuation unit is attached from a first fixing point to the fixed frame and from a second fixing point to the mobile frame mass,
and the number of actuation units is four, and the four second fixing points on the mobile frame mass define a rectangle in the mobile frame plane, and the rectangle is mirror-symmetric in relation to the first axis.

6. The method according to claim 5, wherein the reflector system further comprises:
one or more sensing units connected to the mobile mass system and to the fixed frame, configured to convert the oscillating resonance tilt motion of the mobile mass system in relation to the first axis into one or more sense voltage signals,
one or more drive tuning units connected to the mobile mass system, configured to convert one or more drive tuning voltages into forces which alter the oscillation of the mobile mass system about the first axis,
wherein the method also comprises
repeatedly measuring from the one or more sense voltage signals a first sense signal component which corresponds to common mode resonance oscillation in the mobile mass system and a second sense signal component which corresponds to differential mode resonance oscillation in the mobile mass system, and determining a measured phase difference between the first sense signal component and the second sense signal component,
continuously applying to the one or more drive tuning units one or more drive tuning voltage signals to keep the measured phase difference equal to a predetermined phase difference value.

7. The method according to claim 6, wherein the one or more drive tuning units comprise one or more capacitive transducers with rotor electrodes on the mobile mass frame and stator electrodes on the fixed frame.

8. The method according to claim 6, wherein the one or more drive tuning units comprise one or more capacitive transducers with rotor electrodes on the mobile mass frame and stator electrodes on a cavity wall above or below the mobile frame plane.

* * * * *